March 10, 1925.

A. V. POURROY 1,528,989

ENGINE PISTON

Filed July 24, 1922

INVENTOR.
Armand V. Pourroy
BY M. C. Frank
ATTORNEY

Patented Mar. 10, 1925.

1,528,989

UNITED STATES PATENT OFFICE.

ARMAND V. POURROY, OF OAKLAND, CALIFORNIA.

ENGINE PISTON.

Application filed July 24, 1922. Serial No. 576,952.

*To all whom it may concern:*

Be it known that I, ARMAND V. POURROY, a citizen of the United States, residing at 2914 East 19th Street, in the city of Oakland, county of Alameda, and State of California, have invented a new and useful Engine Piston, of which the following is a specification.

This invention relates to engine pistons, and is more particularly, an improvement on the piston for which I have already applied for Letters Patent, to wit: application, Serial No. 549,985, filed April 6, 1922. The present invention is designed to secure substantially the same objects therein enumerated, and also a much greater simplicity of construction, and consequently, a reduced cost of production.

To the above ends I construct the piston of three principal parts, two of which may be die-castings and the third a sheet metal shell. The said shell is of such form that it can be easily drawn, or spun. To these parts I add fastening means, for securing them together, and also provide for a wrist pin to make the invention effective in an engine.

For the better understanding of my invention, I have illustrated an embodiment of it in the accompanying one sheet of drawings, in which.

Figure 1:
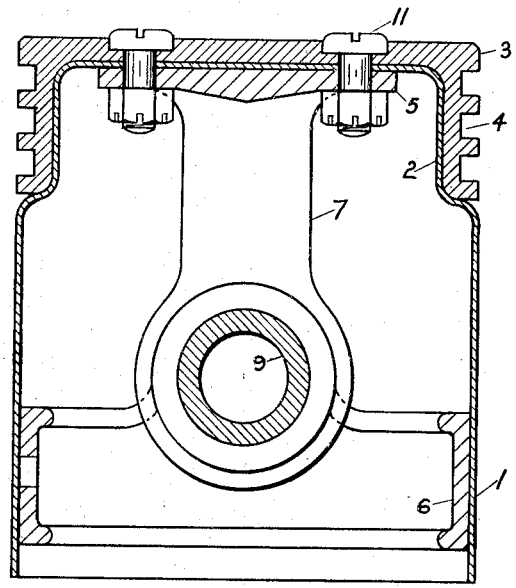
Figure 1 is a central longitudinal sectional elevation of a complete piston, with a wrist pin in place.
Figure 2:
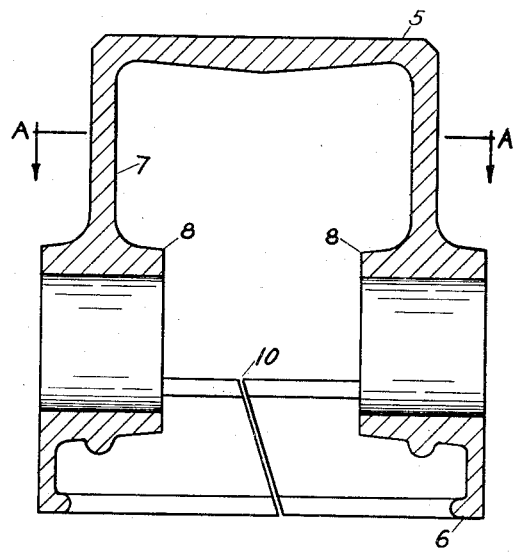
Figure 2 is a similar section, but showing only the frame or interior skeleton at right angles to the position in which it appears in Figure 1.

Referring to the drawings:—My piston is composed of three members, one of which is a seamless shell of sheet metal. This shell comprises a cylindrical end portion 1, and a cup-shaped portion 2 of smaller diameter, but integral with it. The shell member may be formed by drawing as in dies, or by spinning, or otherwise.

Capping the cup-shaped end 2 of the sheet metal shell, is a cup-shaped member 3, preferably a die-casting, having cylindrical outer walls approaching in diameter that of the outer diameter of body 1. This casting is provided with grooves 4, adapted to receive piston rings, which, being well known devices I have thought it unnecessary to show them.

Within the sheet metal member is a yoke or frame member, comprising a head portion 5 at one end, a ring portion 6 at the other end, and arms 7 connecting these two parts. The parts of the yoke are all integral with each other, and may be formed by die-casting, thus reducing machining to a minimum. The yoke is formed with opposing bosses 8 joining its ring portion, and are perforated to receive a wrist pin 9, indicated in Figures 1 and 4. The ring portion 6 may be divided as at 10, to accommodate expansion and contraction.

Figure 4:
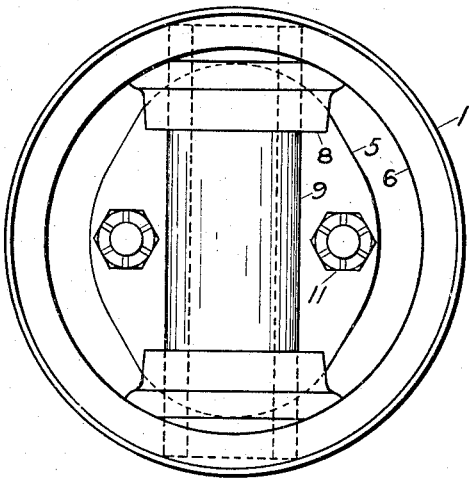
Figure 4 is a bottom plan view of Figure 1.
Figure 3:
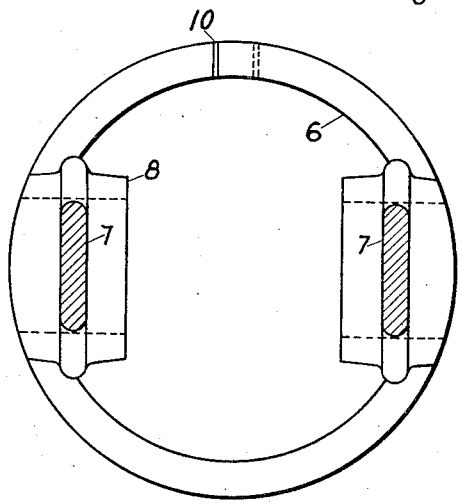
Figure 3 is a cross sectional view of Figure 2, taken on the line A—A and looking in the direction of the arrows.

The cap, the shell and the yoke may be secured together by bolts 11, through those parts at the closed end of the piston, as seen in Figures 1 and 4.

A tripartite piston thus constructed, is exceedingly light, simple and efficient; it requires little or no machining in its production, and any of the parts can be renewed without discarding the others.

In the drawings, I have shown but one specific form of my invention, but it is to be understood that the invention may be embodied in other different forms, each being a species of my invention, and the patent protection that I desire, is all of that which comes within the spirit and scope of what I claim as new, and which claims are the following:

1. A piston having a piston-ring carrying member, a wrist pin and supporting member therefor in the form of a cast yoke having a ring-base, means securing said members together, and a sheet-metal body adapted to be secured therebetween and in contact with said ring-base, the ends of the wrist pin adapted to contact the said body to prevent the lateral movement of said pin.

2. A piston, comprising, a shell consisting of a cylindrical body provided with an integral reduced cup-shaped end, a cap adapted to fit over said reduced end and of diameter approaching that of said cylindrical body, and an interior yoke for supporting the said shell and cap, the said yoke provided with a split ring base to accommodate expansion and contraction.

3. A piston, comprising, a drawn shell consisting of a cylindrical body provided with an integral reduced cup-shaped end, a cap of die-cast material fitting over said reduced end and of diameter approaching that of said cylindrical body, and an interior supporting yoke of die-cast material, the said yoke provided with a ring base adapted to contact and support the body of said shell.

In testimony whereof, I affix my signature.

ARMAND V. POURROY.